US005471602A

United States Patent [19]

DeLano

[11] Patent Number: 5,471,602
[45] Date of Patent: Nov. 28, 1995

[54] SYSTEM AND METHOD OF SCOREBOARDING INDIVIDUAL CACHE LINE SEGMENTS

[75] Inventor: Eric R. DeLano, Ft. Collins, Colo.

[73] Assignee: Hewlett-Packard Company, Palo Alto, Calif.

[21] Appl. No.: 923,187

[22] Filed: Jul. 31, 1992

[51] Int. Cl.$^6$ .............................. G06F 13/16; G06F 13/00
[52] U.S. Cl. ................... 395/445; 364/243.41; 364/259; 364/259.1; 364/259.3; 364/259.9; 364/DIG. 1; 395/453; 395/471; 395/375
[58] Field of Search ................................. 395/425, 400

[56] References Cited

U.S. PATENT DOCUMENTS 5,155,824  10/1992  Edenfield et al. ..................... 395/425
5,233,702   8/1993  Emma et al. .......................... 395/425

OTHER PUBLICATIONS

*PA-RISC 1.1 Architecture and Instruction Set Manual*, Hewlett-Packard Company, 1986–1994.
DeLano et al., "A High Speed Superscalar PA-RISC Processor", *IEEE COMPCOM Spring '92 Digest of Papers*, Feb., 1992.

Primary Examiner—Eddie P. Chan
Assistant Examiner—Reginald G. Bragdon

[57] ABSTRACT

A system and method for scoreboarding individual cache line units in order to reduce the cache store-miss penalty is disclosed. Store operations to cache addresses which generate a store-miss are allowed to occur during the same time period that a missing line is being retrieved from memory. The cache memory is divided into a plurality of cache lines, each of the cache lines having a plurality of data units. A store-scoreboard, associated with a selected one of the cache lines, maintains a record of the contents of the plurality of data units within the selected cache line. Memory access performance is improved by allowing stores which miss the cache to complete in advance of the miss copy-in and by allowing multiple stores to the same cache line (being retrieved from memory) to occur without a penalty during the latency period of the store miss. Furthermore, a "safety net" is provided for hinted store instructions. The storescoreboard provides the infrastructure necessary to allow the computer system to verify whether the instruction stream which contains the hinted store has completed its intended obligation.

17 Claims, 4 Drawing Sheets

SYSTEM AND METHOD OF SCOREBOARDING INDIVIDUAL CACHE LINE SEGMENTS

BACKGROUND OF THE INVENTION

1. Field of the Invention

The present invention relates generally to the design of a cache memory and, more particularly, to a system and method of scoreboarding individual cache line segments in order to reduce the penalty associated with a cache store-miss.

2. Discussion of Related Art

Most modern computer systems include some type of memory hierarchy. The memory hierarchy normally consists of many levels but is typically managed between only two adjacent levels at any one time. The upper level (the one closer to the processor) is smaller and faster than the lower level. The minimum unit of information that can be either present or not present in the two-level hierarchy is called a block (or a line when discussing caches).

Success or failure of an access to the upper level is designated as a hit or a miss, respectively. A hit is a successful memory access to the upper level, while a miss means that the desired data is not found in that level. Misses that are associated with store (write) instructions are referred to as store-misses and misses that are associated with load (read) instructions are referred to as load-misses.

Since performance is the major reason for having a memory hierarchy, the speed of hits and misses is important. Hit time is the time it takes to access the upper level of the memory hierarchy, which includes the time required to determine whether the access is a hit or a miss. Miss penalty is the time required to replace a block in the upper level with a corresponding block from the lower level, plus the time required to deliver this block to the requesting device (normally the processor).

Cache memories are high-speed memories that are placed between microprocessors and main memories. They store copies of main memory that are currently in use in order to speed microprocessor access to requested data and instructions. Caches appear today in every class of computer and in some computers more than once. In order to achieve the speed necessary to aid in microprocessor performance, cache memories are typically built using fast static random access memory circuits (SRAMs). Cache systems typically include a data cache (D-cache) and an instruction cache (I-cache).

Cache memories provide rapid access to frequently used instructions and data thorough load and store instructions. Cache memories communicate to main memory and other caches through "miss transactions." A miss transaction occurs when an instruction generates a cache miss, i.e., when the processor attempts to retrieve data that is not present in the cache memory.

The main advantage of using a cache is that a larger, relatively slow main memory can be made to emulate the high speeds of a cache. When properly implemented, a cache memory can typically have an access time which is three to twenty times faster than that of main memory, thus reducing the overall memory access time. Caches also reduce the number of accesses to main memory. This is especially important in systems with multiple processor's which all compete for access to a common memory.

Cache memories are important in increasing computer performance by reducing total memory latency. A cache memory typically consists of a directory (or tag) and a data memory. Whenever the CPU is required to read or write data, it first accesses the tag to determine whether the data is present in the memory. If the requested word is present in the cache then a cache hit occurs. If the tags do not match, then the data word is not present in the cache. This is called a cache miss. On a cache hit, the cache data memory allows a read operation to be completed quicker than a slower main memory access. The hit rate is the percentage of accesses to the cache that are hits, and is affected by the size and organization of the cache, the cache algorithm used, and the program which is running. An effective cache system should maintain data in a way that maximizes the hit rate.

The servicing of a cache miss is conventionally handled by making room in the data cache for the new data to be input, fetching the data from main memory, and then storing the data in the data cache. Storing the requested data into the data cache is also referred to as a "miss copy-in."

Caches can frequently be categorized according to the store (write) policies which they employ. There are two basic store options employed by caches:

(1) Write-through (or store-through)—Information is written to both the line in the cache and to the block in the lower-level memory.

(2) Write-back (also called copy-back, store-in)—Information is written only to the line in the cache. The modified cache line is written to main memory only when the cache line is replaced.

Write-back cache blocks may be classified as either clean or dirty, depending on whether the information in the cache differs from that in lower-level memory. To help maintain the integrity of the data in the lower level memory and to reduce the frequency of writing clean blocks back to lower level memory, a feature called the dirty bit is commonly used. The dirty bit is a status bit which indicates whether or not the block was modified while in the cache. If it wasn't modified, then the block does not need to be written back to the lower level memory, since the lower level memory has the same information as the cache.

Both write-back and write-through policies have their advantages. With write-back, writes occur at the speed of the cache memory, and multiple writes within a line require only one write to the lower-level memory. Since every write doesn't go to lower level memory, write back uses less memory bandwidth, making write-back attractive in multiprocessor environments. With write-through, read misses don't result in writes to the lower level and write-through is easier to implement than write-back. Write through also has the advantage that main memory always has a current copy of the data. This is important in multiprocessor environments. Hence, multiprocessors want write-back in order to reduce the memory traffic per processor and write-though to keep the cache and memory consistent.

There are two conventional options that can be taken on a store-miss:

(1) Write-allocate (also called fetch on write)—The block is loaded from main memory into the cache, followed by the write-hit actions outlined above; or (2) No write-allocate (also called write around)—The block is modified in the lower level and not loaded into the cache.

While either store-miss policy could be used with write-through or write-back, generally write-back caches use write-allocate (hoping that subsequent writes to that block will be captured by the cache) and write-through caches often use no write-allocate (since subsequent writes to that block will still have to go to memory).

If a processor program requires data to continue its processing stream and that data is not yet available, a condition known as a "stall" will occur. A stall is a period of time that a processor is idle while some peripheral subsystem (e.g., the main or cache memories) are busy acquiring the critical data that caused the stall. In general, load misses and store misses may force a processor to stall.

When a processor encounters a store miss, a line in cache is selected to be displaced (overwritten) by the line in main memory that is referenced by the store miss. The processor then enters a stall state and a store miss transaction is initiated while the line is copied from main memory. When the store miss completes its task, the CPU is able to post the required store data and continue processing.

It is possible to defer the stall in the above scenario if a dedicated local register is provided to which the processor can temporarily post a missed store and thus defer the stall. The missed line from memory can then be combined with the data from the local register at a later time to preserve cache consistency (i.e., ensure that the cache has the most recent data). Using this scheme, the processor can defer the stall for a store miss until a subsequent load requests data from the missed line or a subsequent attempt to store to the same line is made. If the store miss completes before either of those two events occur, then the stall is avoided altogether. This functionality is often referred to as "stall-on-use" or "hit-under-miss."

For a more in depth discussion of cache memory design and operation, see Hennessy et al., *Computer Architecture a Quantitative Approach,* Morgan Kaufmann Publishers (1990) which is incorporated by reference in its entirety herein. Portions of Hennessy et al. have been reproduced above for the convenience of the reader.

As outlined above, conventional cache systems do not allow store operations to a missing cache line to execute until the missing line returns from memory. Thus, what is needed is a mechanism that improves cache performance by allowing stores which miss the cache to complete in advance of the miss copy-in from memory.

SUMMARY OF THE INVENTION

The present invention provides a system and method of scoreboarding individual cache line units in order to reduce the cache store-miss penalty. The present invention allows store operations to cache addresses, which generate a store-miss, to occur during the same time period that a missing line is being retrieved from memory. Each word stored in the cache during the latency period of a store miss sets a scoreboard bit in a store-scoreboard. When the missing cache line returns from main memory only those words which do not have a scoreboard bit set will be replaced by the data read from memory. In other words, the processor maintains a scoreboard bit for each word in the cache line in order to prevent the copy-fill from writing over the words previously written by the store instruction. Thus, the present invention improves performance by allowing stores which miss the cache to complete in advance of the miss copy-in. In addition, during the latency period of a store miss, other stores to the same cache line (being retrieved from memory) can occur without a penalty.

Furthermore, the present invention provides a "safety net" for hinted store instructions. The hinted store instruction indicates that hardware does not need to fetch the missing line from memory because software intends to write to the entire cache line. The hinted store allows the programmer to avoid the copy-in for store misses altogether. The store-scoreboard of the present invention provides the necessary infrastructure to allow the computer system to verify whether the instruction stream which contains the hinted store has completed its intended obligation.

BRIEF DESCRIPTION OF THE DRAWINGS

The above and further advantages of this invention may be better understood by referring to the following description taken in conjunction with the accompanying drawings, in which.

DETAILED DESCRIPTION OF THE PRESENT INVENTION

I. Environment of the Present Invention

An example of an overall system in which the present invention could be used is generally described in Delano et al., "A High Speed Superscalar PA-RISC Processor", *IEEE COMPCOM Spring '92 Digest of Papers,* February 1992, which is incorporated herein by reference. The environment described in this article is selected for illustration purposes only. It is an example of one of many computer systems in which the present invention could be used.

Figure 1:
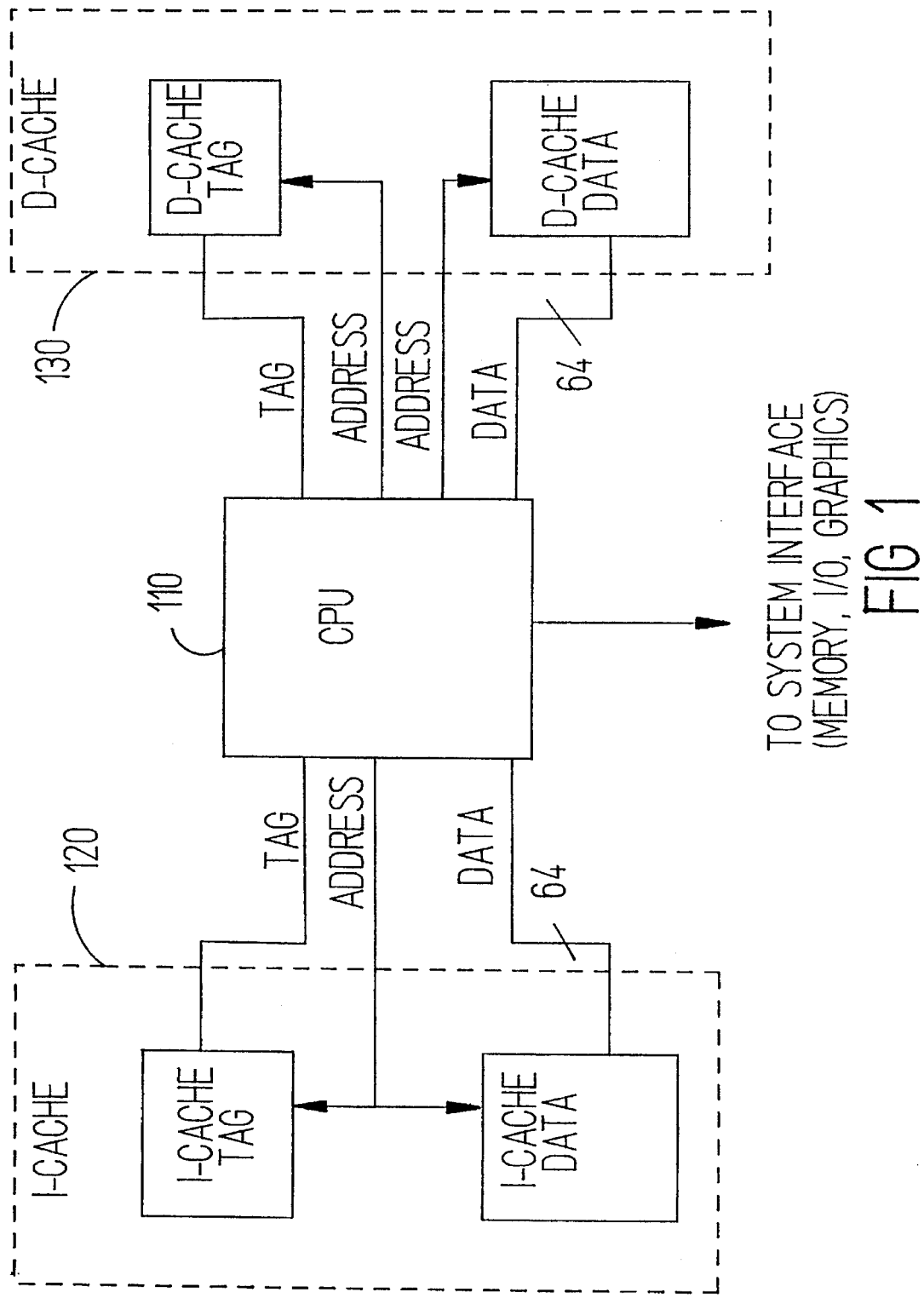
FIG. 1 shows a block diagram of the general environment of the present invention.

Referring to FIG. 1, a processor chip 110 connects directly to an external 64-bit wide instruction cache 120 and an external 64-bit wide data cache 130. These caches are direct mapped and are composed of industry standard high speed SRAMs which are cycled at the processor frequency. At 100 MHz, each cache has a read bandwidth of 800 MB/sec and a write bandwidth of 400 MB/sec. The processor chip supports a D-Cache size from 4K up to 2 Mbytes and a I-Cache size from 4K up to 1 Mbyte. Note that the present invention can be implemented in any computer-based system that utilizes a memory hierarchy. Also note that the present invention is not limited to computer-based systems that only use a single level cache memory. The present invention works equally well with multi-level cache structures.

The cache addresses are hashed in order to reduce the cache miss rate. The present invention is applicable to either off-chip caches or on-chip caches. Note that although the preferred embodiment uses a hashing algorithm, the present invention is completely independent of the specific addressing algorithm employed.

The present invention applies to data cache memories (henceforth denoted simply as "caches"). It should be noted, however, it is contemplated that the teachings of the present invention will be extended to other types of caches. In addition, the present invention applies only to store instructions henceforth denoted "stores". Stores are generally posted to the cache in units of words (4 bytes) or double words (8 bytes). Stores communicate to main memory via store miss transactions denoted "store misses." Store misses communicate to main memory in units known as lines which are generally wider than a double word.

In the preferred embodiment cache lines are 32 bytes (8 words). Lines are copied from main memory to cache in 4 byte units, thus a copy requires 8 cycles. The CPU posts (or retrieves) lines from cache in word (4 bytes) or double word (8 bytes) units. Of course, other system configurations can also be used, and as such, the present invention applies to caches having various line sizes, cache datapath widths, and copy in rates and widths.

II. The Store Scoreboard

As employed herein, "copy-in" is when data is being copied from the lower level memory to the cache memory, while "copy-out" refers to when data is being stored from the cache memory to the lower level memory. A clean line is a cache line which contains exactly the same data as that found in lower level memory (i.e., contains no dirty data). In contrast, a dirty line is a cache line that contains data that is different than that in the lower level memory.

All references to copy-out activities incurred when a cache miss displaces a dirty line (one that has previously been written and is therefore newer than the copy-in lower level memory) have been deleted for clarity and brevity. This omission does not affect the operation or efficiency of the store scoreboard of the present invention.

In order to avoid the penalty associated with a cache-store miss, the present invention has implemented a store scoreboard. As discussed above, each data cache is broken up into a set of cache lines and each cache line is broken up into data units. In essence, the scoreboard is a data structure that contains status information for each data unit in a particular cache line. In the preferred embodiment, only one scoreboard is used. Consequently, the scoreboard can only represent one cache line at any given time. It is contemplated, however, that multiple scoreboards may be implemented. If desired, a maximum of one scoreboard for each cache line in the data cache may be used.

The scoreboard allows an implementation of store stall-on-use functionality without any temporary storage that must recombine with the cache line. The missing store is simply posted to the cache and the store miss merely copies the new cache line around the stored word(s) to preserve consistency. Thus, the line is recombined with the store(s) directly in the cache which is more economical than the conventional techniques. The scoreboard also has the advantage that multiple stores to the same cache line can occur during the latency of a store miss to that same cache line (which is a common occurrence in software). This is important since stalls during store-miss operations are a major contributor to processor performance degradation.

Note that multiple units in the cache line can be stored to at the same time. As noted above, double words are sometimes stored in the cache. Thus, two different units in the cache line are stored to during a double word store. During a double word store, two bite in the store-scoreboard (described below) are set.

As employed herein, a scoreboard is a data structure in which flags are stored. The scoreboard is a means of keeping track of resources and, more particularly, a means of keeping track of a relative age (newness) of the resource. When a store miss is encountered a line in the cache 220 is selected to be displaced. How that selection is made is different in different systems. The algorithm used is irrelevant to an adequate description of the present invention.

Figure 2:
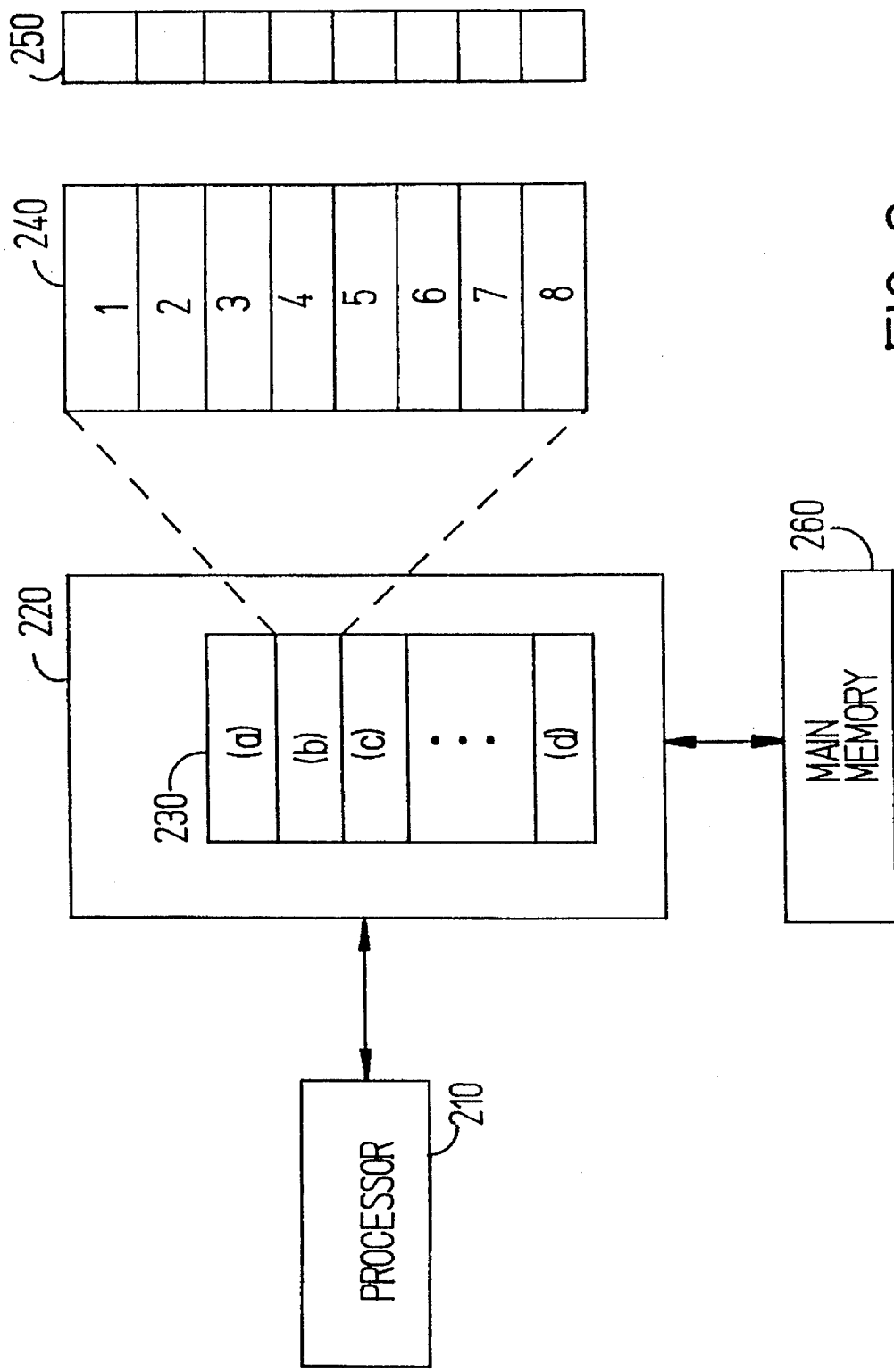
FIG. 2 illustrates an example of scoreboarding an individual cache line segment in accordance with the present invention.
Figure 4:
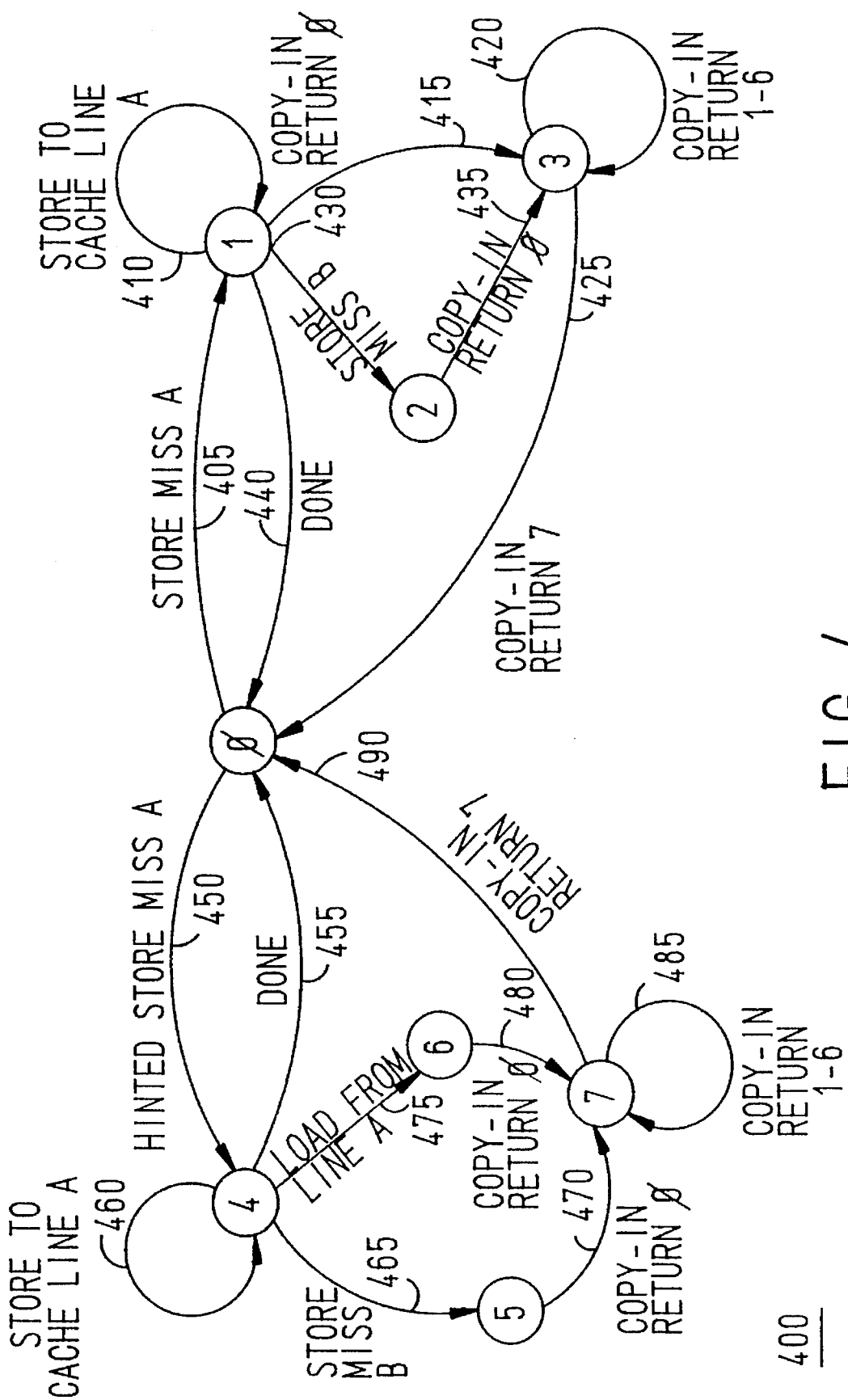
FIG. 4 is a state diagram that demonstrates the operation of the present invention.

Referring to FIG. 2 and FIG. 4, the operation of the scoreboard will now be described. FIG. 2 shows a processor 210 connected to a data cache 220. The data block 230 is divided into cache lines (a) through (d). An exemplary cache line 240 is shown. Cache line 240 is also shown divided up into units (1) through (8). Lastly, a representative scoreboard 250 is shown. The scoreboard 250 consists of eight one bit units to correspond to the eight units of the cache line.

FIG. 4 shows a state diagram 400 that corresponds to the operation of the present invention. Initially, state diagram 400 begins in state 0. State 0 represents an idle state in which there are no store misses or hinted stores in progress. When the processor 210 encounters a store miss to a clean line, the scoreboard 250, consisting of eight boolean flags (bits), is zeroed (i.e., reset). The eight flags correspond one-for-one with the eight copy-in units. The store data is posted directly to the cache 220, and the flag(s) which correspond to the posted word(s) are set. Thus, processing may resume without a stall. These actions are represented by a transition 405 from state 0 to state 1. This transition is labeled "store miss A," where "A" represents the cache line currently assigned to scoreboard 250.

Subsequent stores to the same cache line that occur prior to the miss completion are also posted directly to the cache 220 and the corresponding bits of the scoreboard are set to one. This is represented by a transition 410.

For example, after executing an instruction, processor 210 need to store data into memory location XXX. Memory location XXX is mapped into cache line 240. If processor 210 encounters a store miss while it attempts to store data into cache line 240, it initially sets all the flags in scoreboard 250 to zero. Cache 220 then begins its store-miss routine (i.e., puts in motion a procedure for retrieving the missing cache line from main memory) and the store data is posted to a unit inside cache line 240. A clean cache line is assumed. The flag in scoreboard 250 that corresponds to the unit inside cache line 240 where the data was posted is then set (e.g., to a logical one).

When the missed cache line eventually returns from main memory 260, it is copied-in in eight sequential write operations to cache 220. During this time, a copy-in controller (not shown) consults the status of the scoreboard to determine whether data has previously been stored in the units of the cache line, and is therefore "newer" than the copy-in data. This is indicated by a set flag in the scoreboard. If data has been stored in one or more of the data units, then the "write-enable" signal 370 to the cache line is inhibited to avoid overwriting the more recent contents. Note that other means of inhibiting a write to the cache line can be used, and are contemplated by the present invention. It should become evident to those skilled in the art that the type of memory device used in conjunction with the scoreboard 250 determines what type of inhibitory control signal is utilized. The memory device used by the preferred embodiment of the present invention does, however, use a write enable signal.

A transition 415 from state 1 to state 3 represents the beginning of the copy-in of return data from memory 260. During transition 415, the first word (word 0) of return data is copied-in. While in state 3, a transition 420 represents the next six words (words 1–6) of return data being copied-in. The last word (word 7) is copied-in during transition 425. Note that before the words are copied in the store scoreboard 250 is consulted. Also note that while in state 3 the processor cannot post store data to the cache line currently being stored to by memory 260.

If a second store miss should occur to a different cache line (represented in state diagram 400 as "B") while in state 1, then state diagram 400 transitions 430 from state 1 to state 2. While in State 2, the processor stalls until the copy-in of cache line A is started. Transition 435 represents the beginning of the copy-in of return data (cache line A) from memory 260.

An optional feature of the present invention provides a transition 440 from state 1 to state 0 if all eight store scoreboard bits have been set. If all eight bits are set a copy-in from memory 260 would be worthless since the entire cache line contains new data.

Figure 3:
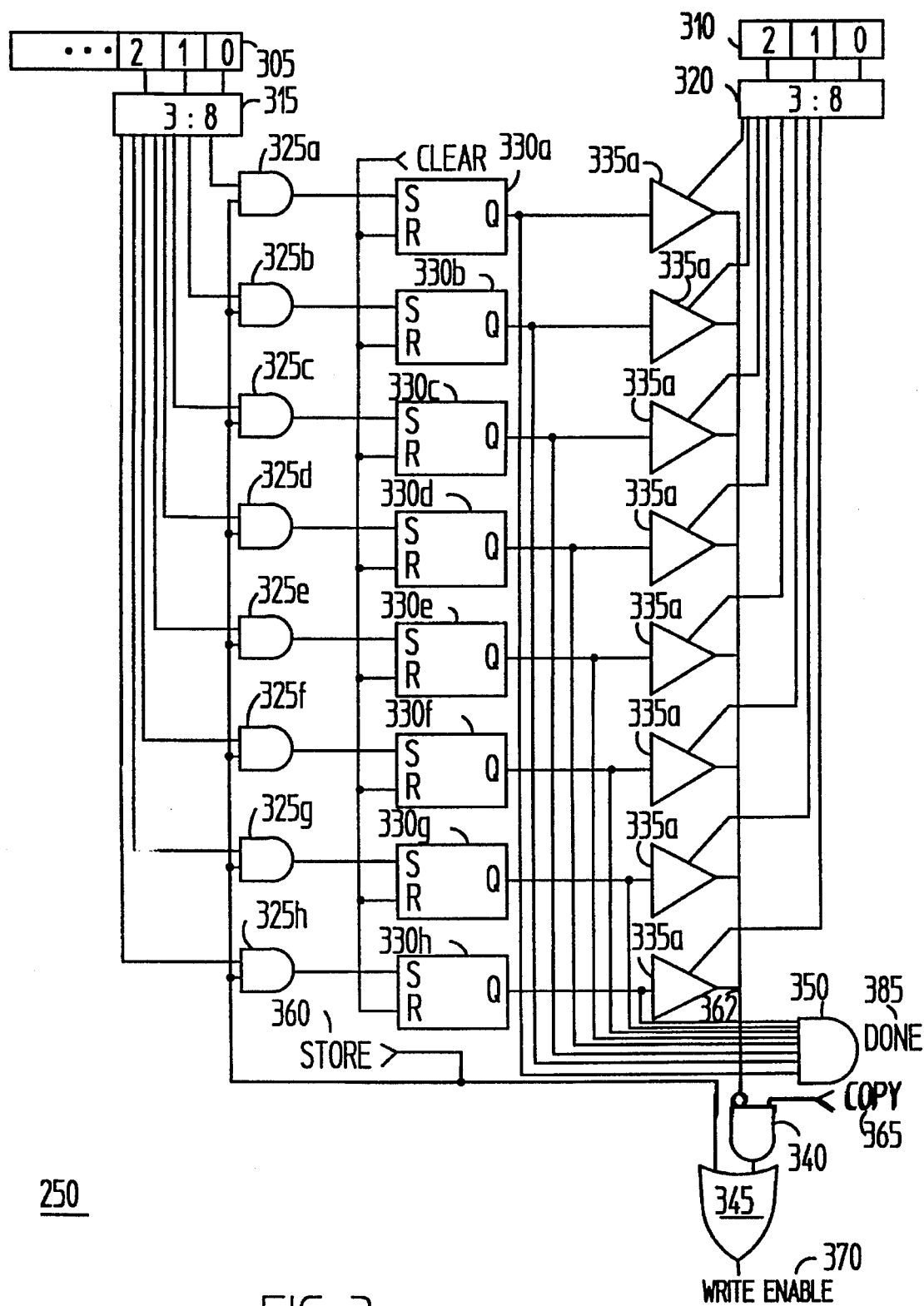
FIG. 3 illustrates a hardware embodiment of the scoreboard in accordance with the present invention.

FIG. 3 illustrates an example of a hardware embodiment of the scoreboard. In this example, cache lines are copied in one word at a time (4 bytes at a time). Each time a word is stored, the write enable signal 370 must be triggered. If the write enable signal 370 is deactivated, then the data will not be stored in the cache line, allowing the system to "copy-in around" data that has been flagged as more recent.

There are eight SR flip-flops 330a–330h, one for each unit in the cache line. Together, flip-flops 330 form the scoreboard. Each flip-flop 330 holds a one bit flag. If a flip-flop 330 is set, then the corresponding unit in the cache line contains data that is more recent than the copy-in data. Thus, if data is going to be stored in the cache line presently protected by the scoreboard (i.e., a set flip-flop), then the write enable signal 370 would be deactivated for the unit that corresponds to the set flip-flop.

Copy-in pointer 310 indicates which word from memory is currently being copied into the cache line in cache 220. The three bits from the copy-in pointer 310 are used as an input to a three-to-eight bit decoder 320. The output from decoder 320 is used to select which bit is to be examined in the scoreboard. By examining the contents of the scoreboard, the write enable signal 370 may be activated or deactivated.

When a store is performed, as indicated by signal 360, to a hinted cache line (defined below) or a cache line with a miss in progress, the low three bits 305 of the store address are checked to determine which unit in the cache line is currently being written to. The three least significant bits 305 of the store address are used as an input to a three-to-eight bit decoder 315. The output from decoder 315 is used to set the appropriate flag in the flip-flop that corresponds to the aforementioned store address.

Note that the output from decoder 315 has eight output signal lines. Each output line is applied as an input to a respective AND gate 325. Thus, only one flip-flop can be set at any given time. Similarly, decoder 320 also has eight output signal lines, wherein each output line is used as a control input to a respective buffer 335.

An AND gate 340 signals whether a particular flip-flop is currently set. The inverted input 362 of AND gate 340 is connected to the outputs of buffers 335a through 335h. During a copy-in (as indicated by signal 365), the buffer 335, corresponding to the flip-flop which coincides with the particular data unit inside the cache line being updated, is checked to determine whether it has been set. If it has been set, then the output from AND gate 340 is low. If it has not been set, then the output of AND gate 340 is high.

An OR gate 345, having an input connected to the output of AND gate 340, activates the write enable signal 370 during a copy-in operation in response to a store signal 360 being set. OR gate 345 activates the write enable during a copy-in operation only if both the copy signal 365 is issued and the flip-flop corresponding to the unit currently being stored to is not set.

A clear signal 380 is used to clear the scoreboard when the system is finished with a particular cache line.

The scoreboard can also be used for the implementation of a more efficient variation of a common store instruction, referred to here as a "hinted store". A "hint" can be thought of as a one bit extension to the op-code (i.e., a variant of a conventional instruction). Both load and store instructions can be augmented with a hint. However, for purposes of the present invention, only hinted stores are discussed.

A hinted store is one in which the programmer declares his intention to eventually write all of the words in the line and therefore requests the processor not to perform the usual copy-in (see *PA-RISC 1.1 Architecture and Instruction Set Reference Manual*, Hewlett Packard (HP) part #09740-90039, November 1990). During a hinted store instruction, the D_Cache is only accessed during the tinge it takes to copy-out the old cache line at the same address (if it is dirty) and to write a new cache tag. Such a programmer might, however, for reasons unknown, be mistaken or be misleading the processor by declaring the hint (i.e., the programmer does not store all eight words). In that case, the processor would need to provide a safety net, either for the safety of the user or for the security of the machine. The scoreboard of the present invention provides an infrastructure suitable for this purpose.

Referring to FIG. 2 and FIG. 4, the operation of the present invention during a hinted store is next described. If a programmer issues a hinted store, represented by a transition 450 from state 0 to state 4, then the scoreboard 240 is initially zeroed. Note that if the scoreboard 240 is already being used, then the processor will have to wait for the scoreboard 240 to be freed. Next, the store is posted to the appropriate cache line and the scoreboard bit(s) 250 corresponding to the written word(s) are set. Posting data to the hinted cache line is represented by state transition 460. Note that, during a hinted store, no copy-in is initiated at this point. When all eight scoreboard bits 250 are set, the user has fulfilled his/her intention and the processor can safely cease to monitor the situation. At this point, the scoreboard is cleared and the state machine 400 returns to state 0 via state transition 455.

If, however, the user violates his intention by attempting to load from a portion of the hinted cache line which he has not yet written, or by attempting to issue a store to a different (missing) cache line before writing all eight words of the original hinted cache line (thereby unfairly clearing the scoreboard), then the processor 210 must initiate a store miss and copy-in around the portion(s) of the hinted cache line that have previously been stored.

An attempt to store data to a second missing cache line produces a state transition 465 from state 4 to state 5 and an attempt to load data from the hinted cache line produces a state transition 475 from state 4 to state 6. Once in either state 5 or state 6, a forced copy-in around the previously stored portions of the hinted cache line must be performed. In either case, the return of the first copy-in data produces a state transition 470 or 480 to state 7. The behavior of state 7 is analogous to state 3 described above.

Referring again to FIG. 3, the hinted store operation is monitored by AND gate 350. The output of each flip flop 330 is applied as a separate input to an AND gate 350. When all eight inputs of AND gate 350 (i.e., the outputs from the eight flip-flops) are set, the output signal 385 will be activated as an indication that the user has fulfilled his/her obligation.

The present invention implements the cache hint feature for both privileged and non-privileged code. For non-privileged code the processor is designed to prevent a user from reading another process' data. However, the implementation of the cache hint allows the performance of non-privileged store hints to be equal to that of privileged store hints as long as the user does not try to read the line being stored. If the user code does not wish to store to the entire cache line, the processor will read the original cache line from memory. As with store misses, the copy fill will not write over words written by the store instructions.

The implementation of the store hint instruction can greatly improve the performance of block copying and zeroing by the operating system. In addition, user mode applications which use store hint instructions (e.g., networking software) or code which performs operations on large arrays can achieve significant performance improvements.

While the invention has been particularly shown and described with reference to preferred embodiments thereof, it will be understood by those skilled in the art that various changes in form and details may be made therein without departing from the spirit and scope of the invention.

What is claimed is:

1. A system for updating a data cache memory during a store-miss for a designated store address, comprising:

a host processor;

a cache memory located between said host processor and a lower level memory, said cache memory divided into a plurality of cache lines, each of said cache lines having a plurality of data units;

a store-scoreboard having a plurality of flag bits, wherein said store-scoreboard maintains a record of the contents of said plurality of data units within one of said cache lines;

means for initiating and executing a store-miss routine that accesses said lower level memory to retrieve data missing from said cache memory, wherein said host processor posts data to said one of said cache lines concurrently with execution of said store-miss routine;

means for setting a bit in said store-scoreboard that corresponds to said data posted to said one of said cache lines; and means, connected to check said store-scoreboard, for storing said data retrieved from said lower level memory into said cache memory around said data posted to said cache memory by said host processor.

2. The system of claim 1, wherein said plurality of flag bits in said store-scoreboard corresponds one-for-one with said plurality of data units.

3. The system of claim 1, wherein said means for storing comprises means for checking said store-scoreboard to determine which of said plurality of data units in said one of said cache lines contains new data.

4. The system of claim 1, further comprising a plurality of store-scoreboards, each of said plurality of store-scoreboards associated with one of said plurality of cache lines within said cache memory.

5. The system of claim 1, wherein said cache memory is a data cache memory.

6. The system of claim 1, further comprising means for assuring that a hinted store instruction has completed its obligation of storing to every data unit in said one of said cache lines.

7. The system of claim 1, wherein said store-scoreboard allows multiple stores to said one of said cache lines during said store-miss routine.

8. The system of claim 1, wherein said store-scoreboard provides an inhibitory control signal to said data units within said one of said cache lines, said inhibitory control signal inhibiting overwriting the contents of said data units.

9. The system of claim 1, wherein said store-scoreboard comprises:

(a) a plurality of flip-flops, each corresponding to one of said data units in said one of said cache lines;

(b) a copy-in pointer that indicates which data from said lower level memory is currently being copied into said one of said cache lines;

(c) a first decoder connected to said copy-in pointer, said first decoder having a first output signal which is used to select which bit is to be checked in said store-scoreboard;

(d) a second decoder connected to receive a designated store address which triggers said initiation and execution of said store-miss routine, said second decoder producing a second output signal for setting one of said plurality of flip-flops;

(e) a plurality of buffers, each connected to the output of a corresponding one of said plurality of flip-flops and controlled by said first output signal;

(f) an AND gate having a first input connected to all outputs of said plurality of buffers and a second input connected to a copy-in signal that indicates data has been returned from said lower level memory, wherein said first input is inverted; and (g) an OR gate having a first input connected to the output of said AND gate and a second input connected to a store signal generated by said host processor, whereby said OR gate activates a inhibitory signal during a copy-in operation if said flip-flop corresponding to the word currently being stored in said specified cache line is set or said store signal is triggered by said host processor.

10. The system of claim 9, further comprising a second AND gate having a plurality of inputs connected to the outputs of said plurality of flip flops, said second AND gate having an output which indicates whether a hinted store instruction has completed its obligation.

11. A method of operating on a computer system having a central processing unit (CPU) and a cache memory for updating the contents of the cache memory, comprising the steps of:

(1) sending a store request to a cache memory having a plurality of cache lines, each of said cache lines having a plurality of data units, said store request resulting in either a cache hit or a cache miss; and (2) activating, upon occurrence of a cache miss, a cache-miss routine, said activating step comprising the steps of:

(a) zeroing a store-scoreboard that keeps track of the relative age of data in said cache memory;

(b) posting store data in a data unit associated with a cache line in said cache memory and activating a store-miss routine;

(c) setting a bit in said store-scoreboard that corresponds to said data unit in said associated cache line; and (d) copying-in a missed cache line into said associated cache line around said posted store data by consulting said store-scoreboard.

12. The method of claim 11, further comprising the step of executing a hinted store instruction, wherein said store-scoreboard is employed to assure that data is stored in all data units of said specified cache line, wherein said execution of said hinted store instruction disables said copying-in step.

13. The method of claim 12, wherein said copying-in step is enabled if said hinted store instruction does not satisfy its obligation to store to each of said data units in said associated cache line.

14. The method of claim 11, wherein said steps (b) and (c) are repeated while said copying-in step is completing if a second store request to said cache memory is made to said associated cache line.

15. The method of claim 11, wherein said cache-miss routine further comprises the steps of checking said associated cache line for dirty data and executing a copy-out routine if dirty data is found.

16. The method of claim 11, further comprising the step of checking, during said copying-in step, a inhibitory control signal for each word being stored.

17. In a computer-based system having a central processing unit (CPU) and a cache memory, wherein the cache memory has a plurality of cache lines, each cache line having a plurality of data units, an apparatus for updating the contents of the cache memory, comprising:
  (1) means for sending a store request to a cache line of the cache memory, said store request resulting in either a cache hit or a cache miss;
  (2) means for activating, upon occurrence of a cache miss, a cache-miss mechanism, comprising:
    (a) means for zeroing a store-scoreboard which keeps track of the relative age of data in said cache memory;
    (b) means for posting store data in a data unit in said cache line of said cache memory and for activating a store-miss routine;
    (c) means for setting a bit in said store-scoreboard which corresponds to said data unit in said cache line; and
    (d) means for copying-in a missed cache line into said cache line around said posted store data by consulting said store-scoreboard.

* * * * *